United States Patent
Glover

(10) Patent No.: US 12,235,214 B2
(45) Date of Patent: Feb. 25, 2025

(54) APPARATUS FOR MEASURING MULTI-WAVELENGTH TRANSMITTANCE USING LEARNED LED TEMPERATURE COMPENSATION MODEL

(71) Applicant: Real Tech Inc., Whitby (CA)

(72) Inventor: James Andrew Glover, Oshawa (CA)

(73) Assignee: Real Tech Inc., Whitby (CA)

( * ) Notice: Subject to any disclaimer, the term of this patent is extended or adjusted under 35 U.S.C. 154(b) by 210 days.

(21) Appl. No.: 17/632,914

(22) PCT Filed: Aug. 6, 2020

(86) PCT No.: PCT/CA2020/051070
§ 371 (c)(1),
(2) Date: Feb. 4, 2022

(87) PCT Pub. No.: WO2021/022372
PCT Pub. Date: Feb. 11, 2021

(65) Prior Publication Data
US 2022/0276162 A1    Sep. 1, 2022

Related U.S. Application Data

(60) Provisional application No. 62/883,334, filed on Aug. 6, 2019.

(51) Int. Cl.
*G01N 21/49* (2006.01)
*G01N 21/31* (2006.01)

(52) U.S. Cl.
CPC .......... *G01N 21/49* (2013.01); *G01N 21/314* (2013.01); *G01N 2021/3181* (2013.01);
(Continued)

(58) Field of Classification Search
CPC ................. G01N 21/49; G01N 21/314; G01N 2021/3181; G01N 2201/0227;
(Continued)

(56) References Cited

U.S. PATENT DOCUMENTS 5,936,250 A * 8/1999 Baliga ................. G01N 21/314
250/345
7,462,835 B2   12/2008 Glover
(Continued)

FOREIGN PATENT DOCUMENTS

ES    2342757 A1    7/2010

OTHER PUBLICATIONS

Chang Moon-Hwan et al: "PEM of Light-Emitting Diodes : Fundamentals, Machine Learning, and the Internet of Things", In: "Prognostics and Health Management of Electronics : Fundamentals, Machine Learning, and the Internet of Things", Aug. 24, 2018, John Wiley and Sons Ltd, Chichester, UK, XP093061450, ISBN: 978-1-119-51533-3 pp. 377-430, DOI:10.1002/9781119515326.ch14, Retrieved from the Internet: URL:https://api.wiley.com/onlinelibrary/td m/v1/articles/10.1002962F9781119515326.ch14.
(Continued)

*Primary Examiner* — Mary Ellen Bowman
*Assistant Examiner* — Joshua M Carlson
(74) *Attorney, Agent, or Firm* — McCarter & English, LLP

(57) ABSTRACT

A device to measure the amount of light able to transmit through a liquid. The device uses a light detector and multiple light emitting diodes (LED's) along with an optical unit such that the light detector, LED's, and an optical unit define a path of light emitted by each individual LED or subgroup of LED's and detected by the detector. The device uses a structure designed to surround the LED's and light detector such that the structure allows the device to be immersed in the liquid and such that the structure is shaped to allow a volume of liquid to be between the LED's and detector, intersecting the light path.

19 Claims, 1 Drawing Sheet

(52) U.S. Cl.
CPC .............. *G01N 2201/0227* (2013.01); *G01N 2201/0625* (2013.01); *G01N 2201/0626* (2013.01); *G01N 2201/1211* (2013.01); *G01N 2201/1235* (2013.01)

(58) Field of Classification Search
CPC ... G01N 2201/0625; G01N 2201/0626; G01N 2201/1211; G01N 2201/1235; G01N 21/8507
See application file for complete search history.

(56) References Cited

U.S. PATENT DOCUMENTS

| | | |
|---|---|---|
| 8,077,315 B2 | 12/2011 | Glover |
| 2011/0292392 A1 | 12/2011 | Tisserand et al. |
| 2014/0362381 A1* | 12/2014 | Lindmuller .......... G01N 21/278 356/408 |
| 2016/0258877 A1* | 9/2016 | Al Hosani ........... G01N 21/532 |
| 2017/0160193 A1* | 6/2017 | Gorritxategi Arrondo ................. G01N 21/01 |
| 2018/0164210 A1 | 6/2018 | Zhang et al. |
| 2019/0173122 A1* | 6/2019 | Ellis .................... G01N 21/552 |
| 2020/0200673 A1* | 6/2020 | Coates .................. G01N 21/85 |
| 2021/0041472 A1* | 2/2021 | Limbach ................ B01L 3/021 |

OTHER PUBLICATIONS

International Search Report dated Nov. 18, 2020, for International Application No. PCT/CA2020/051070 filed Aug. 6, 2020.
Extended European Search Report for European Application No. 20850130.4, dated Jul. 24, 2023, 19 pages.

* cited by examiner

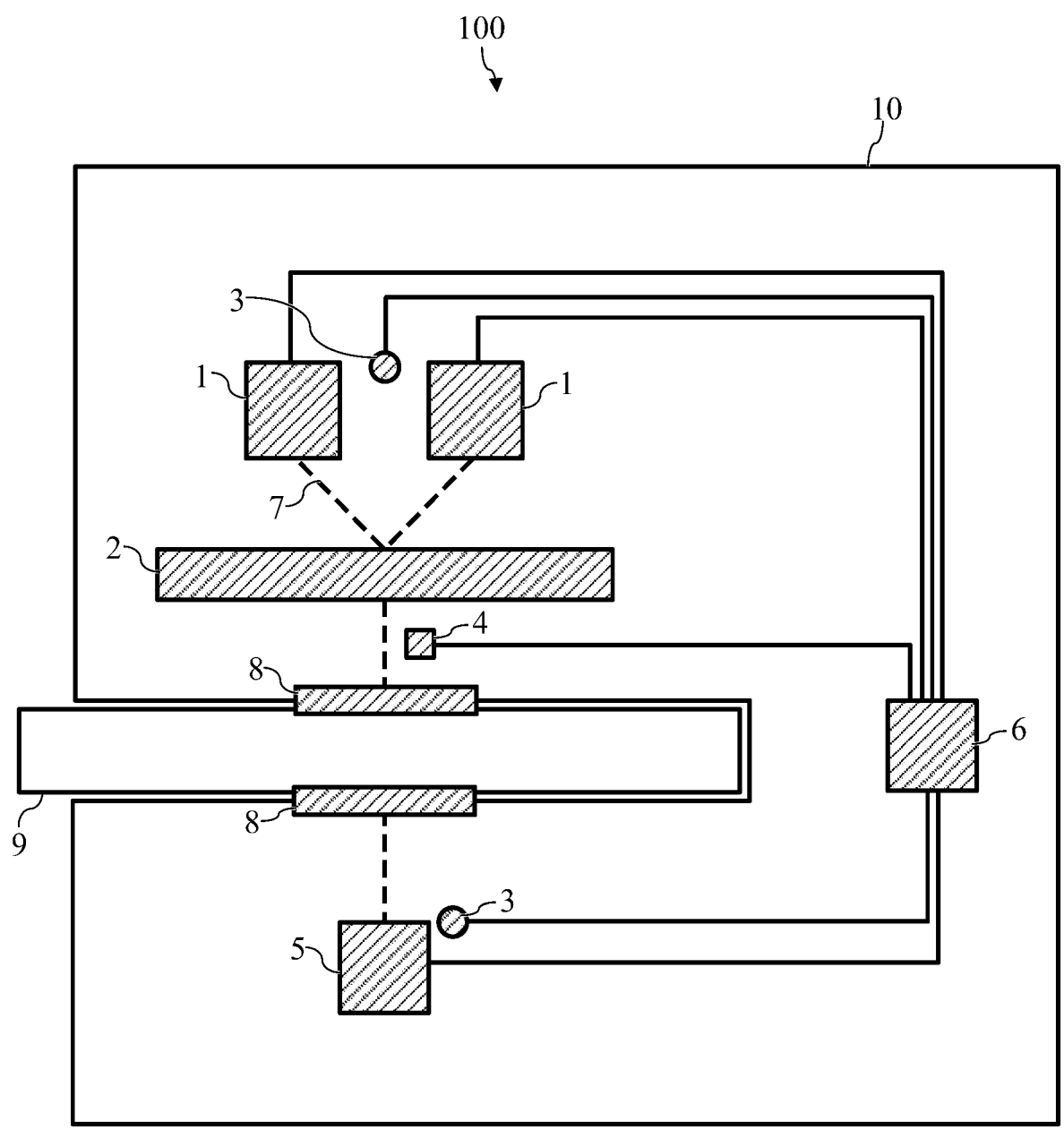

APPARATUS FOR MEASURING MULTI-WAVELENGTH TRANSMITTANCE USING LEARNED LED TEMPERATURE COMPENSATION MODEL

CROSS-REFERENCE TO RELATED APPLICATIONS

This application is a National Phase of PCT Application No. PCT/CA2020/051070, filed on Aug. 6, 2020, and published on Feb. 11, 2021 as WO 2021/022372, in English, which claims priority to U.S. Provisional Patent Application No. 62/883,334, filed on Aug. 6, 2019, all of which are incorporated herein by reference in their entirety.

FIELD

The present invention is related to real-time industrial and municipal water and wastewater quality monitoring. This type of device is used in a variety of applications such as monitoring quality of plant effluent, industrial process control, and dose control applications.

SUMMARY

A device to measure the amount of light able to transmit through a liquid. The device uses a light detector and multiple light emitting diodes (LED's) along with an optical unit such that the detector, LED's, and optical unit define a path of light emitted by each individual LED or subgroup of LED's and detected by the detector. The device uses a structure designed to surround the LED's and light detector such that the structure allows the device to be immersed in the liquid and such that the structure is shaped to allow a volume of liquid to be between the LED's and detector, intersecting the light path.

The structure allows light to transmit through the structure and the liquid. The light propagating between the LED's and the detector passes substantially through the structure and the liquid to be tested such that the amount of light able to transmit through the liquid is detected by the detector. The LED's can be energized one at a time or in sub-groups of the total number of LED's, and a microprocessor is then able to measure via the detector the amount of light for a specific LED or sub-group of LED's able to transmit though the liquid. The device uses at least two LED's that emit light at at least two different wavelengths to allow measurement of transmittance of those wavelengths independently. The optical unit allows measurement of the transmittance of different wavelengths of light through the liquid without the need for any moving mechanical parts. The device uses at least one temperature sensor mounted near the LED's as well as near the light detector to record the temperature of the LED's and detector during transmission measurements.

A microprocessor uses a machine learning based predictive model based on previously collected temperature and transmission data from the temperature sensors and light detectors to compensate the transmittance measurements for the effects of temperature on the raw light output of the LED's as well as detector drift. Such fluctuation and drift is very common in LED's and especially UV LED's and is due primarily to changes in temperature of the LED's and their surroundings.

Thus the present disclosure provides a submersible apparatus for measuring multiple wavelengths of light transmittance through a liquid, the apparatus comprising:

multiple light emitting diode light sources (LED's) of different peak output wavelengths;
a light detector for detecting an intensity of light;
a structure surrounding the LED's and detector wherein the structure allows the apparatus to be submersed in a liquid wherein the structure is shaped to allow a volume of liquid to be between the LED's and detector such that the amount of light able to transmit through the liquid from the LED's is detected by the detector;
an optical unit that collects light from the LED's and directs it though the liquid without the need for moving parts;
at least one temperature sensor mounted near the LED's as well as a temperature sensor mounted near the light detector to record the temperature of the LED's and detector during transmission measurements; and
a microprocessor programmed to:
a) control the LED's such that the LED's can be energized one at a time or in sub-groups of the total number of LED's, and subsequently measure via the detector the amount of light for a specific LED or sub-group of LED's able to transmit though the liquid;
b) use a predictive model applied to data derived from the temperature sensors light detector to compensate the transmittance measurements for the effects of temperature on the raw light output of the LED's as well as temperature related detector drift.

The predictive model may incorporate both historical data from the temperature sensors and light detector as well as recent data to add short-term trend prediction to the transmittance measurements.

The predictive model may be derived through supervised machine learning.

The predictive model may incorporate data related to the effects of individual LED characteristics including different LED current requirements and heat dissipation characteristics, and specific operating configuration including LED pulse length, pulse frequency, and the order of LED activation.

The apparatus may further comprise a visual display controllable by the microprocessor.

The structure may be made of a material substantially translucent to the light emitted by the LED's.

The structure may be made of a material substantially opaque to the light emitted by the LED's, wherein the structure may include windowed apertures in opposed walls of the structure with the windowed apertures being in registration with each other to define a path therethrough for transmitting light through the structure.

The structure may include a first and second region, the LED's contained in the first region, and the light detector contained in the second region.

The apparatus may further comprise a second light detector for measuring an intensity of the LED's, wherein the microprocessor is capable of receiving signals from the second light detector.

The microprocessor may be programmed to incorporate data from the second light detector into the predictive model.

The apparatus may further include a focusing lens that intersects the straight light path and is capable of focusing light on the light detector.

The LED's may include one or more filters that are substantially translucent to a desired wavelength.

The LED's and the light detector may be separated by a distance between about 1 mm and about 600 mm.

The windowed apertures may be separated by between about 0.1 mm and 300 mm, thus defining a path of light through the liquid between about 0.1 mm and 300 mm.

The microprocessor may be programmed to store a measurement of the transmittance of the liquid of known transmittance for each wavelength.

The microprocessor may be programmed for further computing a ratio of a measurement of transmittance of the liquid to the stored measurement of known transmittance resulting in a relative measurement of percent transmittance of the liquid for each wavelength.

The microprocessor may be programmed for further computing the absorbance of the liquid by computing a negative logarithm of the measurement of percent transmittance for each wavelength.

The microprocessor may be programmed with instructions for further computing, using a correction algorithm, an adjusted value of percent transmittance for each wavelength. The apparatus correction algorithm may be a lookup-table of values. Alternatively, the correction algorithm may be an equation.

The microprocessor may be programmed to compute a further output value based on multiple transmittance values attributed to different wavelengths of the LED's. These output value may be based on pre-determined weightings of multiple transmittance values attributed to different wavelengths of the LED's.

The optical unit may be comprised of a collector lens, an optical pinhole and a collimating lens to allow at least two LED's to be mounted beside one another on a plane normal to the light path through the liquid and for light from each LED to be gathered and collimated or focused through the liquid towards to the light detector.

BRIEF DESCRIPTION OF THE DRAWINGS

The invention will be more fully understood from the following detailed description thereof taken in connection with the accompanying drawings, which form a part of this application, and in which:

FIG. 1 is a block diagram showing a light transmittance measuring device constructed in accordance with the present invention.

DETAILED DESCRIPTION

Without limitation, the majority of the systems described herein are directed to an apparatus and method of measuring optical properties of water. As required, embodiments of the present invention are disclosed herein. However, the disclosed embodiments are merely exemplary, and it should be understood that the invention may be embodied in many various and alternative forms.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to real-time industrial and municipal water and liquid quality monitoring.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps, or components.

As used herein, the term "about" or "approximately", when used in conjunction with ranges of dimensions, temperatures or other physical properties or characteristics is meant to cover slight variations that may exist in the upper and lower limits of the ranges of dimensions as to not exclude embodiments where on average most of the dimensions are satisfied but where statistically dimensions may exist outside this region. For example, in embodiments of the present invention dimensions of components of an apparatus and method of measuring optical properties of water are given but it will be understood that these are non-limiting.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the term "fluid" refers to any liquid, gas, or substance that continually deforms under an applied shear stress.

As used herein, the term "light" refers to any electromagnetic radiation, and is not limited to wavelengths of visible light. For example, "light" may refer to radio waves, microwaves, infrared radiation, visible light, ultraviolet radiation, X-rays, or gamma rays.

Referring to FIG. 1, a light transmittance measuring apparatus constructed in accordance with the present invention is shown generally at 100. Multiple LED's 1 (two are shown but more may be included) can be activated independently via the connected microprocessor 6. Microprocessor 6 is also connected to and receives signal from the first light detector 5. The optical unit 2 allows collection and collimation of light from LED's and directs the light towards first light detector 5. Microprocessor 6 is also connected to and receives signal from the temperature sensors 3 (two are shown but more may be included). Microprocessor 6 can activate LED's 1 individually or in sub-groups where multiple LED's are activated simultaneously. In this way, different sets of wavelengths of light can be activated from the total group of possible wavelengths provided by the LED's.

The apparatus may be configured to further include a second light detector 4 to measure the light intensity of light source directly at all times to be used for further compensation or diagnostic purposes.

A structure 10 surrounds the LED's 1, optical unit 2, light detectors 5 and 4, temperature sensors 3 and microprocessor 6, such that the liquid 9 surrounds the apparatus and is able to freely flow between opposed windowed apertures 8 embedded in the structure 10.

In an embodiment of the present device, the microprocessor 6 is programmed to first signal to activate one of the multiple LED's 1 for a period of time. During that period of time the microprocessor 6 reads the signal from the temperature sensors 3 and the first light detector 5, and stores the received signals as digital values. After the digital values are stored, the LED 1 is deactivated. The digital value attributed to the light detector 5 is generally a function of the intensity of light emitted from the activated LED 1, the performance of the light detector 5, and the presence of matter in the liquid 2 that absorbs light at the wavelength or set of wavelengths emitted by activated LED 1 and detected by light detector 5. Using the digital values attributed to both the light detector 5 and the temperature sensors 3, the microprocessor 6 then applies a predictive model of the performance of the LED's 1 and light detector 5 over different temperatures and temperature gradients, to the digital values to provide a measure of transmittance that is temperature compensated and independent of the effects of current temperature and as well as rate of change of temperature. This procedure is then repeated for additional LED's 1 such that transmittance values are stored for each LED 1 or LED sub-groups representing different wavelengths or groups of wavelengths of light.

This entire procedure may be repeated continuously or the procedure may be timed to perform at certain time intervals. Any particular order of the LED measurements is not important for the measurement procedure, though it will affect the predictive model used to compensate for temperature gradients.

Additionally, computed transmittance measurements for liquids containing known levels of light transmittance for different wavelengths may be stored in memory. This allows future ratios of liquids containing unknown levels of light absorbing matter to be compared with the stored values to allow correlations between the measured transmittance of light through the liquid at different wavelengths and the actual level of light absorbing matter in the liquid.

The predictive model used to compensate transmittance measurements from the effects of temperature and temperature gradients, can incorporate both historical data from the temperature sensors and light detector as well as recent data to add short-term trend prediction to the transmittance measurements. The model used can be based on statistical analysis of temperature and transmittance data derived through prior experimentation at time of manufacture. The model can also be improved over time using further measured reference transmittance and temperature data.

In an embodiment the predictive model will use machine learning techniques to allow the apparatus to learn a specific model for a specific instance of the apparatus 100. In this way, each instance of the apparatus 100 will use its own learned predictive model to allow temperature compensated transmittance values.

The predictive model may also incorporate data related to the effects of individual LED characteristics including different LED current requirements and heat dissipation characteristics, and physical separation of the LED's from each other. In addition, operating configurations including LED location, LED pulse length, pulse frequency, and the order of LED activation can all be incorporated into the predictive model.

In an embodiment, the microprocessor 6 is configured to compute a final output value incorporating the set of LED transmittance values, based on pre-determined weightings for each LED transmittance value. Final output values are used to produce water quality information about specific compounds or sets of compounds in water, as characterized by at least two wavelengths of light transmittance.

It will be appreciated that windowed apertures could be designed such that these apertures help to direct the light through the structure in a narrow beam for the purpose of reducing stray light. Further, a lens (not shown) transparent to a desired wavelength of light could be fixed in front of one of the LED's to focus the light into a narrow beam with a purpose of reducing stray light. Further, a lens transparent to a wavelength of light could be positioned in the light path 7 in front of the light detector 5 in order to collect and focus the light that is transmitted from the optical unit 2.

Preferably, LED's 1 and light detector 5 are connected to microprocessor 6 via conductive wires; though they may be connected with other means such wireless receiver and transmitter.

The accuracy and range of the apparatus is directly affected by the length of light path through the thickness of liquid. The distance between the windowed apertures can be any distance in theory, though practical constraints limit this distance to be generally but not limited to between about 0.1 mm and about 300 mm. A longer light transmittance distance through the liquid can improve performance when measuring the light transmittance of liquid with high purity, yet this can decrease performance when measuring the light transmittance of liquid with low purity. A shorter light transmittance distance through the liquid can reduce performance when measuring the light transmittance of liquid with high purity, yet this can increase performance when measuring the light transmittance of liquid with low purity. The final computed light transmittance value can be scaled in software to provide a measurement relative to a particular light transmittance distance through the liquid.

Microprocessor 6 can be programmed to determine when the intensity of light from of the activated LED 1 has become stable enough to take a measurement by measuring and comparing the light source intensity using the light detector 4 or 5 at predetermined time intervals. In an embodiment the LED's 1 are stable enough to take a measurement after between 0.1 ms and 1 s.

The accuracy of light detector readings, whether they measure light source intensity directly or the amount of light transmitted through the liquid, can be improved by using signal conditioning electronics and/or by using various software averaging algorithms. In an embodiment, signal conditioning electronics is used to improve light detector 5 reading accuracy. Such signal conditioning electronics include but are not limited to trans-impedance amplifiers, signal gain amplifiers, and analog to digital converters (ADCs).

Software running on microprocessor 6 can be implemented to average sample sets read from the light detector 5, thereby smoothing out the measured signal. This can further improve the accuracy and increase the signal to noise ratio.

For applications desiring the light absorbance of the liquid, the microprocessor can calculate the light absorbance by evaluating a negative logarithm of the measured light transmittance.

In summary, the present disclosure provides a submersible apparatus for measuring multiple wavelengths of light transmittance through a liquid. In an embodiment the apparatus includes multiple light emitting diode light sources (LED's) of different peak output wavelengths;

a light detector for detecting an intensity of light; a structure surrounding the LED's and detector wherein the structure is configured to allow the apparatus to be submersed in a liquid wherein the structure is shaped to allow a volume of liquid to be between the LED's and detector such that the amount of light able to transmit through the liquid from the LED's is detected by the detector;

an optical unit that collects light from the LED's and directs it though the liquid without the need for moving parts;

at least one temperature sensor mounted near the LED's as well as a temperature sensor mounted near the light detector to record the temperature of the LED's and detector during transmission measurements; and a microprocessor programmed to:
a) control the LED's such that the LED's can be energized one at a time or in sub-groups of the total number of LED's, and subsequently measure via the detector the amount of light for a specific LED or sub-group of LED's able to transmit though the liquid; and
b) use a predictive model applied to data derived from the temperature sensors light detector to compensate the transmittance measurements for the effects of temperature on the raw light output of the LED's as well as temperature related detector drift.

In an embodiment, the predictive model incorporates both historical data from the temperature sensors and light detector as well as recent data to add short-term trend prediction to the transmittance measurements.

In an embodiment, the predictive model is derived through supervised machine learning.

In an embodiment, the predictive model incorporates data related to the effects of individual LED characteristics including different LED current requirements and heat dissipation characteristics, and specific operating configuration including LED pulse length, pulse frequency, and the order of LED activation.

In an embodiment, the apparatus further comprises a visual display controllable by the microprocessor.

In an embodiment, the structure is made of a material substantially translucent to the light emitted by the LED's.

In an embodiment, the structure is made of a material substantially opaque to the light emitted by the LED's, wherein the structure includes windowed apertures in opposed walls of the structure with the windowed apertures being in registration with each other to define a path therethrough for transmitting light through the structure.

In an embodiment, the structure includes a first and second region, the LED's contained in the first region, and the light detector contained in the second region.

In an embodiment, the apparatus further comprises a second light detector for measuring an intensity of the LED's, wherein the microprocessor is capable of receiving signals from the second light detector.

In an embodiment, the microprocessor is programmed to incorporate data from the second light detector into the predictive model.

In an embodiment, the apparatus further includes a focusing lens that intersects the straight light path and is capable of focusing light on the light detector.

In an embodiment, the LED's include one or more filters that are substantially translucent to a desired wavelength.

In an embodiment, the LED's and the light detector are separated by a distance between about 1 mm and about 600 mm.

In an embodiment, the windowed apertures are separated by between about 0.1 mm and 300 mm, thus defining a path of light through the liquid between about 0.1 mm and 300 mm.

In an embodiment, the microprocessor is programmed to store a measurement of the transmittance of the liquid of known transmittance for each wavelength.

In an embodiment, the microprocessor is programmed for computing a ratio of a measurement of transmittance of the liquid to the stored measurement of known transmittance resulting in a relative measurement of percent transmittance of the liquid for each wavelength.

In an embodiment, the microprocessor is programmed for further computing the absorbance of the liquid by computing a negative logarithm of the measurement of percent transmittance for each wavelength.

In an embodiment, the microprocessor is programmed for further computing, using a correction algorithm, an adjusted value of percent transmittance for each wavelength.

In an embodiment, the correction algorithm is a lookup-table of values.

In an embodiment, the correction algorithm is an equation.

In an embodiment, the microprocessor is programmed to compute a further output value based on multiple transmittance values attributed to different wavelengths of the LED's.

In an embodiment, the output value is based on predetermined weightings of multiple transmittance values attributed to different wavelengths of the LED's.

In an embodiment, the optical unit is comprised of a collector lens, an optical pinhole and a collimating lens to allow at least two LED's to be mounted beside one another on a plane normal to the light path through the liquid and for light from each LED to be gathered and collimated or focused through the liquid towards to the light detector.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A submersible apparatus for measuring multiple wavelengths of light transmittance through a liquid, the submersible apparatus comprising:

a plurality of light emitting diodes (LEDs) having different peak output wavelengths;

a first light detector configured to detect an intensity of light;

a structure surrounding the plurality of LEDs and the first light detector, wherein the structure allows the submersible apparatus to be submersed in the liquid, and wherein the structure is shaped to allow a volume of the liquid to reside between the plurality of LEDs and the first light detector such that an amount of light able to transmit through the liquid from the plurality of LEDs is detected by the first light detector;

an optical unit configured to collect the light from the plurality of LEDs and direct the light through the liquid without a need for moving parts;

a second light detector configured to measure an intensity of the plurality of LEDs, the second light detector positioned adjacent to the optical unit, wherein the optical unit is positioned between the plurality of LEDs and the second light detector;

at least one first temperature sensor mounted adjacent the plurality of LEDs and at least one second temperature sensor mounted adjacent the first light detector configured to record a temperature of the plurality of LEDs and the first light detector during transmission measurements; and a microprocessor programmed to:
a) activate a LED of the plurality of LEDs;
b) while the LED is activated, read and store signals from the at least one first and second temperatures sensors and the first light detector as digital values;
c) deactivate the LED;

d) apply a predictive model of a performance of the LED and the first light detector over different temperature and temperature gradients to the digital values to generate a transmittance value for the LED that is temperature compensated and independent of effects of current temperatures of the LED and the first light detector and rates of change of the current temperatures; and e) repeat a-d for additional LEDs of the plurality of LEDs such that transmittance values generated for the LED and the additional LEDs represent different wavelengths of light.

2. The submersible apparatus of claim 1, wherein the predictive model incorporates both historical data from the first and second temperature sensors and the first light detector as well as recent data to add trend prediction to the transmittance measurements.

3. The submersible apparatus of claim 1, wherein the predictive model is derived through supervised machine learning.

4. The submersible apparatus of claim 1, wherein the predictive model incorporates data related to effects of individual LED characteristics of the plurality of LEDs including different LED current requirements and heat dissipation characteristics, and specific operating configuration including LED pulse length, pulse frequency, and order of LED activation.

5. The submersible apparatus of claim 1, further comprising a visual display controllable by the microprocessor.

6. The submersible apparatus of claim 1, wherein the structure is made of a material translucent to the light emitted by the plurality of LEDs.

7. The submersible apparatus of claim 1, wherein the structure is made of a material opaque to the light emitted by the plurality of LEDs, wherein the structure includes windowed apertures in opposed walls of the structure with the windowed apertures being in registration with each other to define a light path therethrough for transmitting light through the structure.

8. The submersible apparatus of claim 1 wherein the structure includes a first region and second region, the plurality of LEDs contained in the first region, and the first light detector contained in the second region.

9. The submersible apparatus of claim 1, wherein the microprocessor is:
capable of receiving signals from the second light detector, and
programmed to incorporate data from the second light detector into the predictive model.

10. The submersible apparatus of claim 1, wherein the plurality of LEDs and the first light detector are separated by a distance between 1 mm and 600 mm.

11. The submersible apparatus of claim 7, wherein the windowed apertures are separated by between 0.1 mm and 300 mm, thus defining the light path of light through the liquid between 0.1 mm and 300 mm.

12. The submersible apparatus of claim 1, wherein the microprocessor is programmed to store transmittance measurements for a plurality of liquids containing known levels of light transmittance for each wavelength.

13. The submersible apparatus of claim 12, wherein the microprocessor is programmed for computing a ratio of a measurement of transmittance of the liquid to the stored, transmittance measurements for the plurality of liquids resulting in a relative measurement of percent transmittance of the liquid for each wavelength.

14. The submersible apparatus of claim 13, wherein the microprocessor is programmed for further computing an absorbance of the liquid by computing a negative logarithm of the measurement of percent transmittance of the liquid for each wavelength.

15. The submersible apparatus of claim 13, wherein the microprocessor is programmed for further computing, using a correction algorithm, an adjusted value of percent transmittance for each wavelength.

16. The submersible apparatus of claim 15, wherein the correction algorithm is one of a lookup-table of values, or an equation.

17. The submersible apparatus of claim 1, wherein the microprocessor is programmed to compute a further output value based on multiple transmittance values attributed to different wavelengths of the plurality of LEDs.

18. The submersible apparatus of claim 17, wherein the further output value is based on pre-determined weightings of multiple transmittance values attributed to different wavelengths of the plurality of LEDs.

19. The submersible apparatus of claim 1, wherein the plurality of LEDs include at least two LEDs mounted beside one another on a plane normal to a light path through the liquid, and wherein the optical unit gathers and one of collimates or focuses the light from each LED of the plurality of LEDs through the liquid to the first light detector.

* * * * *